United States Patent Office 2,726,272
Patented Dec. 6, 1955

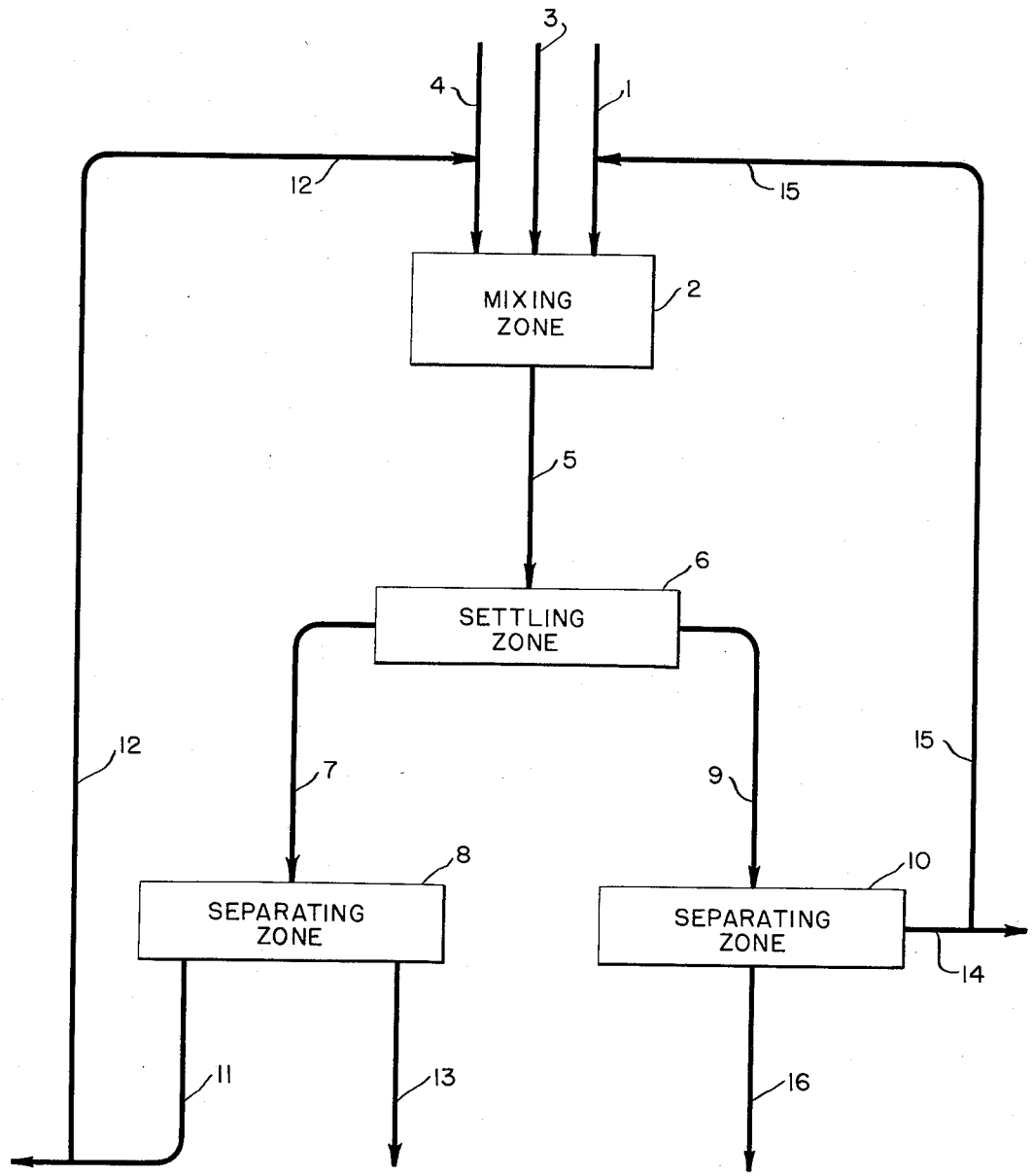

2,726,272

PRODUCTION OF DRYING OILS

Herman S. Bloch, Chicago, and Richard C. Wackher, La Grange, Ill., assignors to Universal Oil Products Company, Chicago, Ill., a corporation of Delaware Application November 13, 1951, Serial No. 256,000

14 Claims. (Cl. 260—666)

This application is a continuation-in-part of our copending application Serial Number 30,159 filed May 29, 1948, now abandoned.

This invention relates to a process for producing drying oils by reacting an olefinic hydrocarbon having at least three carbon atoms per molecule with an unsaturated organic compound selected from the members of the group consisting of non-aromatic unsaturated organic acids, their anhydrides, esters, amides and nitriles. More particularly, the invention is concerned with the production of a substantially saturated liquid hydrocarbon product and a high boiling substantially non-aromatic unsaturated liquid product by condensation, polymerization, and hydrogen transfer reactions between an olefinic hydrocarbon having at least three carbon atoms per molecule and a non-aromatic unsaturated organic acid or its derivative in the presence of an acid-acting hydrogen transfer catalyst.

An object of this invention is the manufacture of an unsaturated organic material having more than one double bond per molecule and useful as a drying oil and as a raw material for production of resins, and the like.

Another object of this invention is the production of a substantially paraffinic hydrocarbon product and a high boiling unsaturated liquid organic material useful as a drying oil.

One specific embodiment of this invention relates to a process for producing a drying oil which comprises reacting an olefinic hydrocarbon having at least three carbon atoms per molecule with an unsaturated organic compound selected from the members of the group consisting of a non-aromatic unsaturated organic acid, its anhydride, ester, amide, and nitrile in the presence of an acid-acting hydrogen transfer catalyst until a reaction mixture is formed comprising essentially saturated hydrocarbons and a used catalyst layer containing a complex of some of the catalyst with poly-unsaturated liquid organic compounds, separating the reaction mixture into a hydrocarbon layer and a used catalyst layer, separating a saturated hydrocarbon product from the hydrocarbon layer, and decomposing the complex in the used catalyst layer to recover a drying oil having an average molecular weight greater than that of the olefinic hydrocarbon charge stock.

A further embodiment of this invention relates to a process for producing a drying oil which comprises reacting an olefinic hydrocarbon having at least three carbon atoms per molecule with an unsaturated organic compound selected from the members of the group consisting of a non-aromatic unsaturated organic acid, its anhydride, ester, amide, and nitrile in the presence of a catalyst consisting essentially of hydrogen fluoride and less than about 10% by weight of water until a reaction mixture is formed comprising essentially saturated hydrocarbons and a used catalyst layer containing a complex of some of the hydrogen fluoride catalyst with poly-unsaturated liquid organic compounds, separating the reaction mixture into a hydrocarbon layer and a used hydrofluoric acid catalyst layer, separating a saturated hydrocarbon product from the hydrocarbon layer, and decomposing the complex in the used hydrofluoric acid catalyst layer to recover a drying oil having an average molecular weight greater than that of the olefinic hydrocarbon charge stock.

Another embodiment of this invention relates to a process for producing a drying oil which comprises reacting a normally liquid monoolefinic hydrocarbon with an unsaturated organic compound selected from the members of the group consisting of a non-aromatic unsaturated organic acid, its anhydride, ester, amide, and nitrile in the presence of a catalyst consisting essentially of hydrogen fluoride and less than about 10% by weight of water until a reaction mixture is formed comprising essentially saturated hydrocarbons and a used catalyst layer containing a complex of some of the hydrogen fluoride catalyst with poly-unsaturated liquid organic compounds, separating the reaction mixture into a hydrocarbon layer and a used hydrofluoric acid catalyst layer, separating a saturated hydrocarbon product from the hydrocarbon layer, and decomposing the complex in the used hydrofluoric acid catalyst layer to recover a drying oil having at least two double bonds per molecule and an average molecular weight greater than that of the normally liquid monoolefinic hydrocarbon charged.

An additional embodiment of this invention relates to a process for producing a drying oil which comprises reacting a normally liquid monoolefinic hydrocarbon with an unsaturated aliphatic carboxylic acid in the presence of a catalyst consisting essentially of hydrogen fluoride and less than about 10% by weight of water until a reaction mixture is formed comprising essentially of saturated hydrocarbons and a used catalyst layer containing a complex of some of the hydrogen fluoride catalyst with poly-unsaturated liquid organic compounds, separating the reaction mixture into a hydrocarbon layer and a used hydrofluoric acid catalyst layer, separating the saturated hydrocarbon products from the hydrocarbon layer, and decomposing the complex in the used hydrofluoric acid catalyst layer to recover a drying oil having at least two double bonds per molecule and an average molecular weight greater than that of the normally liquid monoolefinic hydrocarbon charged.

A still further embodiment of this invention relates to a process for producing a drying oil which comprises reacting a normally liquid monoolefinic hydrocarbon with an unsaturated alicyclic carboxylic acid in the presence of a catalyst consisting essentially of hydrofluoric acid containing less than about 10% by weight of water until a reaction mixture is formed comprising essentially saturated hydrocarbons and a used catalyst layer containing a complex of some of the hydrogen fluoride catalyst with poly-unsaturated liquid organic compounds, separating the reaction mixture into a hydrocarbon layer and a used hydrofluoric acid catalyst layer, separating the saturated hydrocarbon products from the hydrocarbon layer, and decomposing the complex in the used hydrofluoric acid catalyst layer to recover a drying oil having at least two double bonds per molecule and an average molecular weight greater than that of the normally liquid monoolefinic hydrocarbon charged.

Monoolefinic hydrocarbons utilizable in the process have at least three carbon atoms per molecule and comprise propylene, the butylenes, and preferably the normally liquid olefins, including pentenes, hexenes, heptenes, octenes, nonenes, and higher boiling monoolefinic hydrocarbons. A preferred source of such monoolefinic hydrocarbons is polymer gasoline which is formed, for example, by polymerizing propylene and butylenes or mixtures thereof in the presence of solid phosphoric acid catalyst which is a calcined composite of a phosphoric acid and a siliceous carrier such as diatomaceous earth, also called kieselguhr. Fractions of cracked gasoline containing substantial amounts of olefins and relatively small proportions of aromatic hydrocarbons are also suitable charging stocks. These gasoline charging stocks may also contain certain amounts of paraffinic and naphthenic hydrocarbons some of which may be alkylated during the polymerization treatment. $C_3$ and $C_4$ fractions recovered from the products of cracking and a $C_4$ fraction recovered from butane dehydrogenation and containing mainly butylenes and normal butane with relatively little isobutane are also good charging stocks for this process.

This specific invention relates to the production of a drying oil by interacting a monoolefinic hydrocarbon having at least three carbon atoms per molecule with unsaturated organic polar compounds comprising non-aromatic unsaturated carboxylic acids and their derivatives. The non-aromatic unsaturated carboxylic acids may be divided into two classes, namely unsaturated aliphatic carboxylic acids, such as crotonic acid, oleic acid, maleic acid, etc., and (2) unsaturated alicyclic carboxylic acids of which abietic acid is an example. The starting materials of this process include the non-aromatic unsaturated carboxylic acids themselves and their anhydrides which are acidic in reaction as well as their esters, amides, and nitriles which are easily hydrolyzed to form acidic material. The acids included may be mono-, di-, or poly-unsaturated, and they may have other functional groups, such as keto-groups (e. g. licanic acid or oiticica oil), hydroxy groups (e. g. ricinoleic acid or castor oil) or halogen-containing groups. The derivatives such as esters or amides which are condensation products of acids with other compounds (e. g. alcohols or amines, respectively,) may be those derived from mono-functional or poly-functional members of the groups of these other compounds, for example, the esters may be ethyl esters, glycol esters, glyceryl esters, pentaerythritol esters, and so forth.

Examples of unsaturated organic compounds which are useful as starting materials in this process include crotonic acid, sorbic acid, oleic acid, abietic acid, ricinoleic acid, itaconic acid, maleic anhydride, methyl acrylate, ethyl acrylate, acrylonitrile, peanut oil, soybean oil, linseed oil, castor oil, cottonseed oil, tall oil, tung oil and the like. The different unsaturated organic acids used in this process generally have from 3 to about 20 carbon atoms per molecule. Esters of such unsaturated acids are also suitable starting materials.

Polymerization of olefinic hydrocarbons and other unsaturated compounds has been effected heretofore by thermal means and in the presence of various catalysts. The present invention relates to a new method of producing a drying oil by reacting two types of unsaturated starting materials to produce a product which includes both types of reactants and also involves a reaction combining both dehydrogenation and hydrogenation processes to form a product which is poorer in hydrogen, that is, the drying oil, and another product which is richer in hydrogen, that is, the substantially saturated hydrocarbon material which may be regarded as a by-product of the drying oil process. Such a combination of dehydrogenation and hydrogenation processes in the presence of a hydrogen fluoride catalyst, which is a hydrogen transfer catalyst, has been done heretofore using simple monoolefin hydrocarbons as starting materials, but the present invention involves the participation and interreaction of both monoolefin hydrocarbons and unsaturated non-aromatic carboxylic acids and their simple derivatives. The drying oil product so formed by such interaction of monoolefin hydrocarbons and non-aromatic unsaturated carboxylic acids may be referred to as a co-dehydromer of these two reactants while the saturated hydrocarbon material which is produced simultaneously may be referred to by the term hydromer. This process is carried out in the presence of an acid-acting hydrogen transfer catalyst which promotes the formation of a substantially saturated hydrocarbon layer containing the hydromer and simultaneously forms a catalyst layer containing highly unsaturated organic compounds in complex formation with the hydrogen transfer catalyst. From the catalyst layer containing said complexes with the highly unsaturated organic material, the co-dehydromer is separated by suitable means which are referred to hereinafter.

Acid-acting hydrogen transfer catalysts utilizable in the production of drying oils from a sludge containing the same and produced under reaction conditions similar to those employed for the formation of a sludge or lower layer from a hydrogen fluoride catalyst, include in general, certain acid-acting halides such as aluminum bromide and aluminum chloride in their substantially anhydrous forms and used catalyst sludges containing these aluminum halides, sulfuric acid of at least about 90% concentration, boron trifluoride, and mixtures of boron trifluoride and hydrogen fluoride. These other catalysts form co-dehydromers which are structurally and physically somewhat similar to the codehydromers formed when hydrogen fluoride is utilized as the catalyst herein, although they may differ in the degree of unsaturation, conjugation, etc.; but which differ markedly in the manner of recovering the drying oil material from sludges containing said catalysts. Because hydrogen fluoride sludges may be decomposed under such conditions that the catalyst may be recovered in a substantially anhydrous condition, suitable for recycling to the sludge-forming stage, it is generally preferred in the present process. These hydrogen fluoride catalysts contain a major proportion by weight of hydrogen fluoride and generally may contain as much as 10% by weight of water, although the titratable acidity of the catalyst layer may be less than 90% because of the presence therein of dissolved organic compounds including highly unsaturated materials which are described more completely hereinafter. The catalyst preferred in this process is substantially anhydrous hydrogen fluoride, that is, 100% hydrogen fluoride, or the hydrogen fluoride of commerce, of 98+% purity.

The above indicated acid-acting hydrogen transfer catalysts are active in producing drying oil, also referred to herein as co-dehydromer and by-product saturated hydrocarbon or hydromer only when the hydrogen transfer catalyst is present in an amount in excess of that required to form complexes with the non-aromatic unsaturated carboxylic acid or its derivative, which in themselves do not function catalytically in this process. The complexes of these polar compounds with the hydrogen transfer catalyst will normally catalyze simple polymerization of olefinic compounds, but the complexes are not active in effecting hydrogen transfer of the type desired in the present dehydropolymerization process.

The operating temperature used in this process has a profound influence upon the nature of the reaction or reactions occurring when an unsaturated organic acid or its derivative is reacted with an olefinic hydrocarbon having at least three carbon atoms per molecule in the presence of a hydrogen transfer catalyst such as hydrofluoric acid catalyst. Part of this effect of temperature may be due to the behaviour of the olefinic hydrocarbons themselves in the presence of hydrogen fluoride. Thus while ethylene reacts with hydrogen fluoride to form mainly ethyl fluoride and also certain amounts of polymers at temperatures from about 0° to about 175° C., propylene gives some isopropyl fluoride at the lower operating temperatures but good yields of hydromer and dehydromer at the higher temperatures of treatment within the mentioned range of 0° to about 175° C.

In contrast to the behavior of ethylene which produces ethyl fluoride as a major product, the monoolefins having at least three carbon atoms per molecule undergo extensive polymerization and condensation with unsaturated organic compounds selected from the members of the group consisting of non-aromatic unsaturated organic acids, their anhydrides, esters, amides, and nitriles, in the presence of hydrofluoric acid catalyst and with only a small amount of alkyl fluoride formation at temperatures of from about 0° to about 175° C., and preferably at temperatures of from about 25° to about 125° C. It appears that a specific temperature threshold exists for dehydropolymerization and that this temperature threshold is above the temperature needed for ordinary polymerization of olefins. Dehydropolymerization takes place preferably at a temperature of about 25° C. and upward whereas ordinary polymerization (which does not involve hydrogen transfer) such as the formation of dimers, trimers and long chain polymers occurs at lower temperatures, some of which are even considerably below 0° C.

Also the interaction of these monoolefinic hydrocarbons and particularly normally liquid monoolefinic hydrocarbons with non-aromatic unsaturated carboxylic acids and their derivatives in the presence of acid-acting hydrogen transfer catalysts, particularly hydrogen fluoride, involves more than the simple combination of olefin molecules to form dimers, trimers, tetramers, and higher polymers. It has been observed and these observations have been made the basis of the present process that when a mixture of monoolefinic hydrocarbon and a non-aromatic unsaturated organic acid or its derivative is subjected to hydrogen transfer in the presence of a catalyst of the type herein specified, a drying oil is formed of a type significantly different from that produced in other reactions in which the monoolefin hydrocarbon alone is contacted with the hydrogen transfer catalyst. The modified chemical structure of the drying oil formed in this process and the oxygen chemically combined in the organic molecule has a marked effect upon the drying and adhering properties of the material. The drying oil obtained in this process forms an air-dried film of excellent adherence which dries to a non-tacky, non-brittle film possessing the desired properties of such films for drying oil purposes. Furthermore, the presence of non-aromatic unsaturated organic acids or their derivatives in the charging stock tends to increase the yield of drying oil obtained from a given weight of charge and hydrogen transfer catalyst.

The production of a drying oil by what we call a "dehydropolymerization" process depends upon the presence of an excess of an acid-acting hydrogen transfer catalyst such as liquid hydrogen fluoride which reacts with the unsaturated starting materials forming complexes therewith. The series of reactions herein referred to in the aggregate as a "dehydropolymerization reaction" comprises an initial co-polymerization and condensation reaction between monoolefinic hydrocarbons and non-aromatic unsaturated organic acids or organic acid derivatives which are contained in the charging stock. As the reaction progresses, cyclization, isomerization and condensation reactions occur accompanied by a hydrogen transfer between the constituents present in the reaction mixture whereby a portion of the product is converted into saturated hydrocarbons (called hydromer) by virtue of hydrogen transfer at the expense of other components which are converted into highly unsaturated organic compounds called dehydromer, having on an average of from about 2 to about 5 double bonds per molecule of which from about 30 to about 70% are conjugated. The resulting dehydromer comprising a series of high molecular weight polyolefinic cyclic compounds becomes attached by weak secondary chemical bonds to the catalyst to form a sludge-like complex addition product in which the fluorine (in the case of hydrogen fluoride catalyst) is not, however, organically bound, since substantially all of it can be recovered by treatment of the complex with cold water or with cold aqueous alkali. Saturated hydrocarbon products or hydromer formed simultaneously separate as a substantially insoluble upper layer when the entire reaction mixture is permitted to stand. Since the formation of the unsaturated drying oil product is dependent upon the presence of hydrogen acceptors in the reaction mixture, it also follows that the proportions of hydrogen acceptor to hydrogen donors influence the total unsaturation of the polyolefinic drying oil product which is formed and also has an effect upon the yield or drying oil product obtainable from given weights of monoolefinic hydrocarbons and non-aromatic unsaturated organic acids charged to the process. Since the dehydromer-catalyst complex is further incapable of catalyzing further hydrogen transfer, the yield of drying oil is also dependent upon the presence of sufficient catalyst to carry the reaction to completion—i. e., the point at which no appreciable amounts of hydrogen acceptor and/or hydrogen donor remain. The knowledge of the relationship between the unsaturation of the hydrocarbon charging stock, the unsaturation of the ultimate drying oil product, and the amount of catalyst required, is embodied in the utilization of an admixture of non-aromatic unsaturated organic acids and monoolefinic hydrocarbons as charging stock in the present process in order to form a greater yield of drying oil with a different chemical structure than that of a product prepared similarly by reacting only a monoolefinic hydrocarbon in the presence of liquid hydrogen fluoride or than that obtained from the same reactants in the presence of small quantities of catalyst. The oxygen or nitrogen modified structures of the drying oils obtained in accordance with the process herein provided are believed to be the basic factors involved in the formation of the more adherent, more elastic and tougher films formed on drying of the oils when exposed to atmospheric oxygen.

In the present process a relatively large amount of the hydrogen transfer catalyst is employed. Thus at least 10% by weight of hydrogen fluoride is used based upon the organic reactants and even as much as 1000% in some types of operation. Heretofore, a reaction between rosin and diolefinic hydrocarbons, such as butadiene and isoprene, in the presence of not more than about 1.5% by weight of boron trifluoride as the preferred catalyst was reported. This method of the prior art also mentioned that hydrofluoric acid could be employed similarly but since the major part of such a reaction mixture comprised rosin, the carboxylic acids of which form catalyst complexes with HF or with $BF_3$, the essential catalytic conditions required for producing our type of drying oil were also lacking. It appears that the method of the prior art was concerned solely with simple formation of mixed solid polymers from rosin and diolefins, not involving hydrogen transfer, rather than with our method of producing drying oils. These reactions of the prior art employed such small amounts of catalyst, which would form complexes with the rosin acids and thus substantially eliminate uncomplexed, free catalyst, that the catalyst used would lose its ability to promote hydrogen transfer. As a result, high molecular weight solid simple copolymers of relatively saturated character are the sole product. Furthermore, this method of the prior art includes as equivalents catalysts which are capable of effecting hydrogen transfer (under otherwise suitable conditions) and also catalysts incapable of so acting at the given temperature and concentration conditions, and likewise teaches the equivalence of all these catalytic polymerizations with thermal copolymerization which is known to be of the simple type rather than that which involves the complex group of reactions called dehydropolymerization which result in the production of applicants' liquid drying oil product.

In this process we are the first to show that non-aromatic unsaturated carboxylic acids or other polar compounds, which are themselves capable of forming complexes with hydrogen fluoride, take part in a dehydropolymerization reaction of the type herein described even though drying oils may have been produced similarly from monoolefinic hydrocarbons alone in the presence of liquid hydrogen fluoride catalysts. The success of our process as indicated above depends on the presence of an excess of catalyst beyond that which enters into the formation of complexes with the reactants. Our process comprises a new and unexpected sequence of reactions which are neither taught nor anticipated by any combination of references of the prior art, by which a drying oil is formed from a mixture of monoolefinic hydrocarbons and non-aromatic unsaturated carboxylic acids, their anhydrides, esters, amides, and nitriles, which drying oil has (1) greater molecular unsaturation than the charging stock; (2) contains both conjugated and isolated unsaturation, although the charge stock may have had no conjugated unsaturation; and (3) contains oxygen (or nitrogen, if an unsaturated nitrile or amide was charged). At the same time, a relatively saturated hydrocarbon product, or hydromer is formed, which (1) contains components of greater molecular weight than the charge stock; (2) contains naphthenic rings, although the charge stock may have been completely open-chain; and (3) is more saturated than the charge stock.

The prior art teaches that the product formed by reacting rosin with a diolefin in the presence of 1.5% of boron trifluoride or of hydrogen fluoride has lower unsaturation than the charging stock, this behavior being that expected in a simple mixed polymer formed by the simple union of molecules of rosin with diolefin as distinguished from our process for producing a highly unsaturated drying oil. Further the aforementioned method of the prior art taught no formation of a separate catalyst layer and the separation of such a layer for separate recovery of products therefrom, this latter step being an essential and distinguishing feature of our process. Furthermore, although the product previously formed by reacting a monoolefin hydrocarbon alone in the presence of a hydrogen transfer catalyst had two of the three essential properties of our drying oil mentioned above, and was also recovered from a separate catalyst phase, this prior art product did not contain oxygen or nitrogen, and there was no suggestion in the prior art teaching that such an improved product could be made. Accordingly, it is clear that dehydropolymerization is qualitatively different from simple polymerization and that dehydropolymerization involving two radically different types of unsaturated starting materials, such as monoolefin hydrocarbons and non-aromatic unsaturated carboxylic acids is a new reaction which is unpredictable from either the known reactions of simple mixed polymerization of monoolefins with other unsaturated organic compounds or the dehydropolymerization of only one of these unsaturated materials, such as the monoolefin hydrocarbons.

Study of the ultra-violet and infra-red absorption spectra and other properties of drying oil fractions formed from polymer gasoline and boiling from about 150° to about 200° C., shows that many of these drying oil hydrocarbons contain a pair of conjugated double bonds with one of these double bonds in a ring of five carbon atoms and the other double bond in an alkenyl side chain. Thus a cyclopentene ring may be combined with a methylene group or a vinyl group. However, some of the drying oil hydrocarbons may also contain a cyclopentadiene ring. The drying oil hydrocarbons which contain a cyclopentenyl ring also contain more than two substituent groups but each of these groups is highly substituted. The higher boiling fractions of this drying oil boiling up to about 450° C. contain non-aromatic polycyclic hydrocarbons which are generally bicyclic. In both the monocyclic and polycyclic hydrocarbons the five-carbon atom ring portions of the molecules are combined with at least two alkyl groups or two unsaturated aliphatic groups. The data obtained on these fractions indicate that one of the double bonds comprised by the conjugated diene systems of the drying oil is within a five-carbon atom ring and the other double bond is in an alkenyl or alkapolyenyl substituent. Alkapolyenyl groups that may be present are highly branched and contain isolated unsaturation as well as conjugated unsaturation. Some of the typical hydrocarbons contained in the drying oil mixtures so produced from polymer gasoline are represented structurally by the following formula:

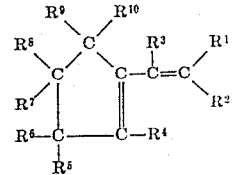

wherein the radicals $R^1$ to $R^{10}$ are selected from the group consisting of hydrogen and alkyl, alkenyl and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the drying oil formed from polymer gasoline are believed to have structures that may be represented by the formula:

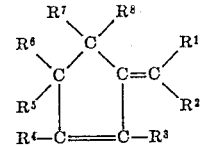

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The drying oils of the present process contain organic compounds having some of the aforementioned five-carbon atom ring structures condensed with a non-aromatic unsaturated organic acid or its derivatives, and thereby modified by the presence of carboxy groups (or derivatives thereof) integrated in their molecular structure.

The condensation products formed from the olefinic hydrocarbons and non-aromatic unsaturated organic acids and their derivatives, which are of higher molecular weight and degree of molar unsaturation than the olefinic hydrocarbon charging stock and also have good drying oil properties, may be regarded as containing mixtures of co-dehydromers and of high boiling dehydromers having a high degree of conjugated and non-conjugated unsaturation. Such drying oils have the advantage that many of them form protective films that are less brittle and more durable than those films formed from high boiling unsaturated oils produced similarly from olefinic hydrocarbons alone without the addition of unsaturated organic compounds selected from the members of the group consisting of non-aromatic unsaturated organic acids, their anhydrides, esters, amides and nitriles.

This process for producing drying oils may be modified further by incorporating in the reaction mixture a certain amount of a more unsaturated olefinic hydrocarbon, namely, a dienic hydrocarbon, as for example, butadiene-1,3, isoprene, cyclopentadiene, and the like, or an acetlenic hydrocarbon.

The present process consists essentially, in its preferred form, of contacting an olefinic hydrocarbon and a non-aromatic unsaturated organic acid or its derivative with substantially anhydrous hydrogen fluoride at dehydropolymerization conditions, separating the upper saturated hydrocarbon layer from the lower sludge layer, and then decomposing the sludge by water hydrolysis, by heating or by another suitable method, to recover the drying oil therefrom.

Improvement in adhesive properties of the drying oil product is observed when there is present about two mole per cent of the unsaturated organic compound selected from the members of the group consisting of a non-aromatic unsaturated organic acid, its anhydride, ester, amide and nitrile. When more than about an equal molar proportion of the non-aromatic unsaturated organic polar compound is present, the amount of condensation and speed of the condensation process are retarded. Accordingly, the molar ratio of olefinic hydrocarbon to unsaturated organic acid, anhydride, ester, amide or nitrile will depend upon the properties desired in the product but may vary from about 1 to about 50. It should be pointed out, however, that valuable materials useful in the preparation of drying oils, resins, and other chemical products may be formed by treating unsaturated organic acids and their derivatives with hydrogen transfer catalysts in the absence of olefinic hydrocarbons.

The weight ratio of hydrogen fluoride catalyst or organic charging stock, that is, the combined mixture of olefinic hydrocarbon and other unsaturated organic compound will usually vary from about 0.1 to about 10. It should be borne in mind, however, that the amount of catalyst must exceed the quantity which complexes with the polar reactants, so that the minimum quantity will vary with the amount of organic acidic material charged. When the hydrogen fluoride to organic compound weight ratio is less than about 0.1, it is necessary to recycle excessive amounts of organic compounds in order to obtain good conversion while increases in this ratio above about 10 effects very little further increase in yield of the desired reaction products but such increased ratio of hydrogen fluoride to total organic reactants does decrease the capacity of the reactor and other treating equipment.

The present process is carried out at a temperature of from about 0° to about 175° C., and at a pressure sufficient to maintain the reactants and catalyst in substantially liquid phase. The operating pressure is generally from about 1 to about 100 atmospheres. At these reaction conditions, a vigorously agitated mixture of hydrogen fluoride, unsaturated organic compounds selected from members of the group consisting of a non-aromatic unsaturated organic acid, its anhydride, ester, amide, and nitrile, and olefinic hydrocarbon containing at least three carbon atoms per molecule yields a high proportion of catalyst layer containing poly-unsaturated organic compounds during a time of from about 1 to about 30 minutes, but the reaction may be continued for a longer time to obtain a better yield of the poly-unsaturated organic compounds as evidenced by the more highly saturated character of the hydromer or hydrocarbon mixture which is separated as an upper layer from the hydrogen fluoride layer.

Normally liquid olefinic hydrocarbons are more desirable as charging stocks than propylene and butylenes because of the increased yields of both saturated and unsaturated liquid products and improved properties of the products obtained from these preferred charging stocks. About the same quantity and quality of drying oil are obtained when charging any of the olefins having from 5 to about 20 carbon atoms per molecule. The different monoolefins having at least 5 carbon atoms per molecule appear to be interconvertible by polymerization and depolymerization reactions at the conditions specified for this process.

It should be noted further that the introduction of polar groups into the polyenic drying oil permits further modification of this product. For example, if acidic groups are introduced into the molecule by dehydropolymerization, the product may be esterified subsequently with either monohydric or polyhydric alcohols, or be reacted with amines, of either saturated or unsaturated type, to make a large variety of esters and amides having a wide range of properties.

In carrying out this process an olefinic hydrocarbon having at least three carbon atoms per molecule, an unsaturated organic compound selected from the members of the group consisting of non-aromatic unsaturated organic acids, their anhydrides, esters, amides, and nitriles and liquid hydrofluoric acid catalysts are added to a suitable reactor provided with adequate means of agitating the reactor contents and for controlling the temperature therein. Since the condensation, polymerization, and co-polymerization reactions of this process are exothermic it is generally necessary to cool the reactor in order to maintain the chosen reaction temperature. The olefinic hydrocarbon, non-aromatic unsaturated polar organic compound, and hydrogen fluoride catalyst are generally mixed at such rates that substantially all of the organic compounds charged are converted into the saturated hydrocarbon layer or hydromer and the high boiling highly unsaturated organic materials, or co-dehydromer, contained in the hydrofluoric acid layer. After the desired quantities of organic materials comprising essentially olefinic hydrocarbons and unsaturated organic compounds have been added to the hydrofluoric acid, or after the hydrofluoric acid has been added to the organic materials, the agitation or stirring of the reaction mixture is continued for a time sufficient to ensure substantially complete conversion of the reactants into saturated hydrocarbons and also highly unsaturated organic liquids having drying oil properties. The agitation or mixing is then stopped and the reaction mixture is permitted to stand whereby it forms two layers; an upper substantially saturated hydrocarbon layer and a lower hydrogen fluoride layer. The substantially saturated hydrocarbon layer is separated from the lower hydrogen flouride layer comprising essentially hydrogen fluoride and highly unsaturated organic material with drying oil properties.

As the saturated hydrocarbons of the upper layer boil over about the same range of temperature as do the unsaturated drying oil constituents recoverable from the hydrogen fluoride lower layer and as small amounts of the saturated hydrocarbons are entrained or mixed with the hydrogen fluoride lower layer, it is advisable to extract the hydrogen fluoride lower layer with a low boiling saturated hydrocarbon, preferably a paraffin having from 3 to about 8 carbon atoms per molecule, before hydrolyzing, or otherwise decomposing, the hydrogen fluoride lower layer to recover the unsaturated drying oil therefrom. From the lower layer, the hydrogen fluoride and drying oil fractions are then separated by suitable means, for example, the lower layer may be added to water or ice whereby the hydrogen fluoride is dissolved in water to form an aqueous solution from which the drying oil separates as an upper layer. Also the lower layer may be subjected to flash distillation to vaporize the hydrogen fluoride from the higher boiling highly unsaturated drying oil. When the lower layer is separated by distillation methods, the recovered hydrogen fluoride is suitable for recycling to the process to effect reaction of additional quantities of charged monoolefinic hydrocarbon and unsaturated organic compounds selected from the member of the group consisting of non-aromatic unsaturated organic acids, their anhydrides, esters, amides and nitriles.

Passage of inert gas, such as nitrogen, hydrogen, methane, ethane, carbon dioxide, and the like through the distillation system in which the hydrogen fluoride is being separated, assists in the recovery of the highly unsaturated drying oil. Separation of hydrogen fluoride from the drying oil present in the lower layer is also assisted by carrying out the flash distillation of said lower layer in a tower containing catalytic packing material formed from graphitized carbon or from a metal selected from the members of the group consisting of aluminum, copper, cobalt, lead, cadmium, and an alloy of copper, such as brass, and preferably in the presence of an inert carrier gas to assist in removing the liberated hydrogen fluoride.

Another method of decomposing the hydrogen fluoride-drying oil mixture of the lower layer formed by the reaction of hydrogen fluoride with a mixture of olefins and unsaturated polar organic compounds, is to introduce the lower layer or sludge into an inert liquid, such as a paraffinic hydrocarbon, contained in a decomposition zone and maintained at a temperature near its boiling point. The decomposition zone or reactor tower may contain a catalytic packing material in the liquid zone of this reactor tower and an inert gas may also be passed therethrough. Hydrogen fluoride so liberated is vaporized, condensed, and conducted to storage while the inert liquid containing the dissolved, highly unsaturated drying oil is withdrawn from the decomposition zone, either intermittently, or continuously, and replaced by fresh liquid. This liquid should be readily separable from the drying oil dissolved therein and it should also be relatively inert to the hydrogen fluoride sludge and to the products of the decomposition of the sludge. If a paraffinic naphtha is employed, its normal boiling point should be from about 100° to 150° C. so that it may be separated by fractional distillation from the drying oil which boils generally from about 150° to above 450° C.

One method of carrying out the process of this invention is illustrated diagrammatically by Figure 1 which is a flow diagram indicating the various steps of the process. According to the method illustrated, an olefin-containing feed stock, such as a butane-butylene fraction, a pentane-pentene mixture, cracked gasoline, polymer gasoline, and the like, is directed through line 1 to mixing zone 2 to which an unsaturated organic compound selected from the members of the group consisting of non-aromatic unsaturated organic acids, their anhydrides, esters, amides, and nitriles is directed through line 3 and hydrofluoric acid of 90 to 100% hydrogen fluoride concentration is introduced through line 4. Mixing zone 2 comprises a coil, an agitated reaction zone or other mixing equipment preferably provided with suitable temperature control means, such as, for example, a cooling or heating jacket or a cooling or heating coil in order to maintain the reaction mixture at a chosen temperature within the limits of from about 0° to about 175° C. The reaction mixture present in mixing zone 2 may also contain recovered hydrogen fluoride and a low boiling saturated hydrocarbon which are separated from the final reaction products and recycled through lines 12 and 15 respectively, to lines 4 and 1 as hereinafter described. The olefin-containing feed stock, unsaturated polar organic compounds and hydrogen fluoride are contacted in mixing zone 2 for a time sufficient to convert substantially all of the olefin hydrocarbon monomer and unsaturated organic compound into condensation products and polymers and also to effect hydrogen transfer reactions between the several reaction components so as to produce a substantially saturated hydrocarbon product, the hydromer, and a highly unsaturated product, the codehydromer, the latter being associated with the liquid hydrogen fluoride in the form of a complex. From mixing zone 2, the resultant mixture is directed through line 5 to settling zone 6 wherein the mixture or emulsion of organic compounds and liquid hydrogen fluoride is permitted to stand and separate into an upper hydrocarbon layer and a lower hydrofluoric acid catalyst layer. From settling zone 6, the hydrofluoric acid catalyst layer is withdrawn through line 7 to catalyst layer separating zone 8 while a substantially saturated hydromer which separates as an upper layer in zone 6 is directed therefrom through line 9 to hydrocarbon layer separating zone 10.

The hydrogen fluoride catalyst layer in separating zone 8 is subjected to flash distillation to separate hydrogen fluoride from highly unsaturated dehydromer, comprising drying oil materials. The used hydrogen fluoride so separated in zone 8 is directed therefrom through line 11 and at least a portion thereof is directed through recycle line 12 to line 4, and thence to mixing zone 2 already mentioned, while the highly unsaturated liquid drying oil material is discharged from separating zone 8 through line 13 to storage or to further purification or fractionation not illustrated in Figure 1.

The hydromer layer so separated from used hydrogen fluoride catalyst in settling zone 6 is subjected to suitable fractionation in hydrocarbon separating zone 10. Fractional distillation of the hydrocarbonaceous material present in zone 10 separates therefrom as an overhead fraction a mixture of residual dissolved hydrogen fluoride and substantially saturated low boiling hydrocarbons introduced to the process in the olefin-containing charging stock or formed during the conversion reaction. Thus when charging a butane-butylene fraction, the hydrocarbon stream being directed from separating zone 10 through line 14 is mainly normal butane while this stream is mainly normal pentane when a pentane-pentene mixture is charged to mixing zone 2. If desired, a portion of the low boiling saturated hydrocarbon fraction which is discharged through line 14 may be directed therefrom through recycle line 15 to line 1, already mentioned, through which the olefin-containing feed stock is directed to the process. After removal of the low boiling saturated hydrocarbons in hydrocarbon separating zone 10 a substantially saturated hydrocarbon product formed by the hydrogen transfer reactions is directed from zone 10 through line 16 to storage or to use not illustrated in the diagrammatic drawing.

When the olefinic charging stock does not contain a substantial proportion of saturated hydrocarbons having from 3 to about 8 carbon atoms per molecule, it is advisable to extract the hydrofluoric acid layer with such a solvent before separating the drying oil from the hydrofluoric acid layer in separating zone 8.

The following examples are given to illustrate the process of this invention although the data introduced should not be construed to limit unduly the broad scope of the invention.

EXAMPLE I

Several runs were made in which a polymer gasoline and an unsaturated organic compound selected from the members of the group consisting of non-aromatic unsaturated organic acids, their anhydrides, esters, amides, and nitriles were reacted in contact with hydrofluoric acid of from about 90 to about 100% HF concentration to form reaction products from which drying oils and resin intermediates were recovered. The polymer gasoline used in these runs had the properties shown in Table I.

*Table I*

| | |
|---|---:|
| Specific gravity, °API | 67.2 |
| $d_4^{20}$ | 0.712 |
| Vapor pressure, (Reid) lbs | 12.7 |
| Bromine No. | 132 |
| Sulfur, weight per cent | 0.04 |
| Mol weight (calculated) | 105 |
| Ave. No. double bonds per molecule | 0.9 |
| Engler distillation: | |
| I. B. P. °F | 83 |
| 10 | 140 |
| 30 | 206 |
| 50 | 231 |
| 70 | 276 |
| 90 | 383 |
| E. P. | 436 |
| Per cent over | 94.5 |
| Per cent botts | 1.5 |
| Per cent loss | 4.0 |

185 grams of the polymer gasoline referred to in Table I and 20 grams of crotonic acid were charged to a Turbomixer autoclave of one liter capacity and then 192 grams of anhydrous hydrogen fluoride was added to the mixture of polymer and crotonic acid. The resultant reaction mixture was stirred for one hour at a temperature of 90° to 95° C. and at a maximum pressure of 122 pounds per square inch. The resultant reaction mixture was then allowed to stand in a settler at 4 to 10° C. and separated into 296 grams of a lower hydrofluoric acid layer and 91 grams of a hydrocarbon upper layer. The upper layer after washing with water, sodium bicarbonate solution and again with water and drying weighed 84 grams. The lower layer was washed with pentane and then hydrolyzed with a mixture of water and ice, with the resultant separation of an oil layer which after washing with water, sodium bicarbonate solution and again with water followed by drying weighed 98 grams.

In this treatment of polymer gasoline and crotonic acid with anhydrous hydrogen fluoride, a substantial amount of dehydropolymerization was obtained as evidenced by the formation of a hydrocarbon upper layer and a lower hydrofluoric acid layer from which high boiling organic compounds were released by hydrolysis. Carbon and hydrogen analysis of the organic material recovered from the hydrofluoric acid lower layer showed the presence of 1.42% oxygen which accounts for 19% of the oxygen charged in the crotonic acid. The molecular weight of the organic material recovered from the hydrogen fluoride lower layer was 287 and thus agreed closely with the value of 285 calculated on the basis of 19% co-dehydropolymerization. The results obtained indicated that crotonic acid was not present in the upper layer in view of the low acidity and saturated character of the latter. It is believed that some of the crotonic acid may have been hydrogenated to butyric acid and this was then washed out in the hydrolysis and washing steps. The partial functioning of crotonic acid as a hydrogen acceptor would account for the large yield, namely 48% of the organic charge.

Drying tests on the resultant drying oil recovered from the hydrogen fluoride lower layer showed that it dried readily to form a film with a Sward hardness of 14. The dried film was less brittle than that obtained from the oil made from polymer gasoline alone without the addition of an unsaturated acid such as crotonic acid.

Other properties of the upper layer hydrocarbons and lower layer drying oil obtained by this process are given in Table 2, together with similar results obtained in following Examples II, III, IV, and VI.

The resultant reaction mixture was then separated into 87 grams of upper layer and 307 grams of lower layer.

Hydrogen transfer and dehydropolymerization occurred in this process as evidenced by the fact that the upper layer consisted of saturated hydrocarbons containing only a slight amount of acidic material. The upper layer after washing with water and drying amounted to 81 grams while the lower layer after hydrolysis and water washing yielded 111 grams of organic liquid. The large yield of lower layer product was apparently the result of both the dehydrocopolymerization and a function of the sorbic acid acting as a hydrogen acceptor. The carbon and hydrogen analysis of the product recovered from the lower layer showed the presence of about 2.8% oxygen which represented about 44% of the oxygen charged in the sorbic acid. The dehydrocopolymerization of olefinic hydrocarbons and unsaturated acid that did occur may be noted from the high molecular weight of 333 which calculations show to be approximately correct assuming the usual drying oil yield formed from the olefinic hydrocarbons and combination of 50% of the sorbic acid. It is also noted that a large percentage of the drying oil fraction boils above 325° C. Drying tests on films of this oil gave rather brittle coatings both in the presence of and absence of driers such as the naphthenates of cobalt, manganese, and lead.

Further properties of the upper layer hydrocarbons and lower layer drying oil obtained in this process are given in Table II.

EXAMPLE III

A mixture of 183 grams of the aforementioned polymer gasoline, 57 grams of commercial abietic acid and 185 grams of anhydrous hydrogen fluoride was stirred for one hour at a temperature of 90°–95° C. and at a maximum pressure of 175 pounds per square inch. The resultant reaction mixture was then separated into 104 grams of an upper layer and 318 grams of a lower hydrogen fluoride layer. Hydrolysis of the hydrogen fluoride lower layer yielded 119 grams of unsaturated oil

Table II

PROPERTIES OF DRYING OIL PRODUCTS FORMED FROM POLYMER GASOLINE AND NON-AROMATIC UNSATURATED ACIDS AND MALEIC ANHYDRIDE

| Example No. | I | II | III [1] | IV | VI |
|---|---|---|---|---|---|
| Unsaturated Acid, Etc. | Crotonic | Sorbic | Abietic | Maleic Anhyd. | Tall Oil |
| Upper Layer: | | | | | |
| Bromine No. | 1 | 0.5 | 0.7 | <0.5 | 1 |
| $n_D^{20}$ | 1.4205 | 1.4206 | 1.4302 | 1.4269 | 1.4239 |
| $d_4^{20}$ | 0.7448 | 0.7442 | 0.7680 | 0.7651 | 0.7580 |
| Spec. Disp. | | 101 | 104 | 115 | 102 |
| Acidity (mg. KOH/g.) | 0.1 | 0.1 | | 1.2 | 3.8 |
| Percent boiling over 200° C. | 54 | 57.1 | 59.7 | 62 | 61.3 |
| Lower Layer Product: | | | | | |
| Bromine No. | 140 | 127 | 110 | 85 | 132 |
| Maleic Anhydride Value | 65 | 51 | 66 | 30 | 51 |
| Mol Wt. | 287 | 333 | 344 | 381 | 393 |
| Double bonds per molecule, Ave. | 2.40 | 2.6 | 2.4 | 2.0 | 3.2 |
| $n_D^{20}$ | 1.4931 | 1.4959 | | 1.4984 | |
| $d_4^{20}$ | 0.8839 | 0.9030 | 0.9150 | | 0.9019 |
| Spec. Disp. | | 140 | | | |
| Viscosity (poises at 25° C.) | below 5 | <5 | 4 | >25 | 6 |
| Color (Gardner) | 18 | >18 | >18 | >18 | >18 |
| Carbon, Percent | 86.32 | 85.26 | 88.13 | 77.83 | 85.31 |
| Hydrogen, Percent | 12.26 | 11.94 | 10.67 | 10.63 | 12.26 |
| Acidity (mg. KOH/gm.) | 1.4 | 3.41 | | 87 | 13.7 |
| Percent boiling above 275° C. | 74.8 | 86.0 | | 72 | |
| Percent boiling above 325° C. | 58.6 | 72.6 | 77.0 | Above 305° | 76.4 |

[1] Gas analysis: CO, 59.2 mole percent; $H_2$, 2.0%; $iC_4H_{10}$, 19.0%; $n-C_4H_{10}$, 17.5% and olefins 2.0 percent.

EXAMPLE II

Following the procedure used in Example I, 185 grams of polymer gasoline, 25 grams of sorbic acid, and 188 grams of anhydrous hydrogen fluoride were stirred together for one hour at a temperature of 90°–95° C. and at a maximum pressure of 112 pounds per square inch.

containing about 1.2% by weight of oxygen as evidenced by carbon and hydrogen analysis. This oxygen content represents 24% of the oxygen charged in the abietic acid and from the consideration of the determined molecular weight of 334, it probably represents the same amount of dehydrocopolymerization.

Abietic acid is known to decarboxylate rather easily. The high pressure produced in this reaction gave evidence of this and 3300 cc. of gas was produced. This gas analyzed 59.2% CO which represents 23% of the charged oxygen. The normally expected $CO_2$ was not found. It may be quite soluble in the acid lower layer and thereby may have escaped detection. The solubility of $CO_2$ in the acid layer need be only about 1% to account for the remaining 53% of charged oxygen. This then would also account for the large yield of lower layer product, since the oxygen-free decahydropenanthrene derivative would not be found by carbon-hydrogen analysis.

In the drying test a film of this drying oil dried readily to a hard but brittle finish. In the presence of a drier comprising the naphthenates of cobalt, lead, and manganese, the oil dried hard in one-third the time required without drier.

Some additional properties of upper layer and lower layer products resulting from this run are shown in Table II.

EXAMPLE IV 186 grams of the aforementioned polymer gasoline and 22 grams of maleic anhydride were charged to a turbo-mixer of one liter capacity, the free space was flushed with nitrogen, and then 211 grams of anhydrous hydrogen fluoride was introduced. The resultant reaction mixture was stirred for one hour at a temperature of 90°–95° C. and at a maximum preessure of 145 pounds per square inch. In this run, the molar ratio of polymer gasoline to maleic anhydride was 8 to 1, and the molar ratio of hydrogen fluoride to olefinic charge was about 5 to 1. At the end of this treatment for one hour the resultant reaction mixture was permitted to stand at 4°–10° C. and a hydrogen fluoride lower layer of 312 grams was separated from a hydrocarbon upper layer of 95 grams. The hydrogen fluoride lower layer was washed with pentane and was then hydrolyzed by treatment with ice which resulted in the separation of high boiling organic material. The high boiling organic material, after washing with water, potassium bicarbonate solution and again with water and dried, weighed 103 grams. Upper layer hydrocarbons after washing and drying weighed 73 grams.

In this run, substantially 100% dehydrocopolymerization occurred. Also the lower layer product contained 11.54% oxygen on the basis of carbon and hydrogen analysis. This oxygen content of the lower layer product accounted for 98% of the total maleic anhydride used. This oxygen content of the reaction product also indicated 1.4 acid radicals per mol on the basis of the 381 molecular weight obtained experimentally.

A film of the drying oil product containing no added drier dried slowly to a flexible coating which had a Sward hardness of 12 on the twentieth day. With added drier (toluene containing metal naphthenates added to the sample to give 0.025% cobalt, 0.2% manganese, and 0.1% lead), the product dried in half the time required without drier to a film of Sward hardness 20, but the resulting film was somewhat brittle.

Other properties of the upper layer and the lower layer product obtained by this treatment of polymer gasoline and maleic anhydride with liquid hydrogen fluoride are given in Table II.

EXAMPLE V 200 grams of oleic acid and 197 grams of anhydrous hydrogen fluoride were stirred together at a temperature of 90°–95° C. for one hour. Under these conditions, the oleic acid yielded no detectable upper layer but some polymerization occurred as evidenced by the high molecular weight of the organic material recovered upon hydrolyzing the hydrofluoric acid lower layer. A total of 198 grams of organic material was obtained by this hydrolysis. The organic material so obtained from the hydrofluoric acid layer did not dry during a time of 42 days although it became sticky and showed definite drying characteristics.

Another run was made in which oleic acid and polymer gasoline showed the usual sludging characteristics with hydrogen fluoride resulting in the formation of an upper layer and a lower layer. In this run, 53 grams of oleic acid and 187 grams of polymer gasoline were contacted with 204 grams of liquid hydrogen fluoride and stirred for one hour at a temperature of 90°–95° C. The upper layer, after washing with water, contained 60 grams of substantially saturated hydromer hydrocarbons. Hydrolysis of the lower layer yielded 115 grams of drying oil which has a bromine number of 149, a maleic anhydride value (diene number) of 50, a molecular weight of 750, and a color (Gardner) of 18. The 115 grams of drying oil so obtained represented a yield of 48% based on the total charge or of 62% based on the polymer gasoline. The yield of drying oil generally obtained from the polymer gasoline alone is 35–40%. Although the high yield alone does not necessarily indicate dehydrocopolymerization (in view of the behavior of oleic acid alone), the yield together with the properties of the product are indicative of such inter-reaction. The codehydromer has a molecular weight of 750 whereas the drying oil obtained from the polymer gasoline has a molecular weight of about 290. The drying oil so formed from polymer gasoline and oleic acid has a neutralization equivalent of 3290 which by calculation represents 0.24 acid radicals per mole. Carbon and hydrogen analysis, however, showed 2.05% oxygen which represents 0.47 acid radicals per molecule.

Ultraviolet absorption analysis of the polymer gasoline-oleic acid codehydromer showed a distinct maximum at 249 mu. with an extinction co-efficient of 24 which represented a maleic anhydride value of 50. This is somewhat lower than that of drying oil obtained similarly from polymer gasoline alone but on the basis of a molecular weight of 750 it represents 2.96 conjugated double bonds per molecule which is about 50% more than those found in drying oil produced from polymer gasoline alone. Similarly, the bromine number of 149 represents seven double bonds per molecule which is a little more than twice that found in the drying oil produced from polymer gasoline.

Drying tests on the drying oil formed from polymer gasoline and oleic acid showed it dried slowly to give a hard flexible film which did not become brittle in 72 days.

Other properties of the upper layer hydrocarbons and lower layer drying oil obtained by the treatment of polymer gasoline and oleic acid with hydrogen fluoride are given in Table III.

Table III

REACTION OF OLEIC ACID WITH POLYMER GASOLINE

| | |
|---|---|
| Upper layer treatment: | |
| 1. Recovered after water washing, gms. | 60 |
| 2. Recovered after 30% alcohol washing, gms. | 47 |
| 3. Recovered upon acidifying wash water of both upper and lower layers and ether extraction, gms. | 0.5 |
| 4. Recovered from pentane wash of lower layer, gms. | 23.5 |
| Lower layer hydrolysis: | |
| 1. Recovered, gms. (a) | 115.6 |
| 2. Recovered, gms. (b) | 107 |
| Inspection of products: | |
| Upper layer 2, Bromine No. | 1 |
| $d_4^{20}$ | 0.783 |
| Fluorine, per cent | 0.069 |

(a) After pentane wash of lower layer, hydrolyzing over ice and water washing (Neut. Equiv.=3290).
(b) After alkaline wash, 30% alcohol wash, separating emulsified upper layer and distilling off water under reduced pressure.

Inspection of products:

| | |
|---|---|
| Neutral equivalent | 21300 |
| Per cent boiling above 200° C | 66.6 |
| Upper layer 4, Bromine No | 2 |
| $d_4^{20}$ | 0.765 |
| Neutral equivalent | 4050 |
| Lower layer 2, bromine No | 149 |
| Maleic anhydride value (diene No.) | 50 |
| Viscosity (poises at 25° C.) | Above 100 |
| Carbon, per cent | 85.65 |
| Hydrogen, per cent | 12.30 |
| Color (Gardner) | 18 |
| Mol. weight | 750 |
| Per cent boiling above 300° C | 96.5 |
| Double bonds per mole, ave | 7 |

EXAMPLE VI 185 grams of the polymer gasoline referred to in Table I, 65 grams of tall oil and 205 grams of anhydrous hydrogen fluoride were reacted in a steel turbomixer of one liter capacity at a temperature of 90°–95° C. for one hour at a maximum pressure of 141 pounds per square inch. The resultant reaction mixture was then permitted to settle at 4°–10° C. and 347.5 grams of hydrofluoric acid lower layer was separated from an upper layer weighing 92 grams. The upper layer and pentane extract of the lower layer were combined, washed with water, dried, to yield 99.5 grams of a substantially saturated hydrocarbon mixture. The lower hydrofluoric acid layer was hydrolyzed with water, washed and dried, to yield 126.5 grams of liquid product which represented 51% by weight of the total of polymer gasoline and tall oil charged.

Tall oil, sometimes known as liquid rosin, is essentially a mixture of abietic acid and unsaturated $C_{18}$ fatty acids, containing about 40% of the former and 50% of the latter as well as other minor constituents. The refined sample used in this experiment had a bromine number of 62 and an acidity equivalent to 162 mgs. of potassium hydroxide per gram. In this run, dehydropolymerization was obtained with the formation of a saturated upper layer and an unsaturated lower layer. Carbon and hydrogen analysis on the lower layer product showed a possible 2.43% oxygen which represents 48% of that charged in the tall oil on the basis of the above stated average composition of tall oil. Being intermediate between oleic acid and abietic acid, the tall oil might be expected to give an intermediate product. The yield of all three are very much the same while the physical properties of the product from tall oil are intermediate. This is shown in the following table:

Table IV

INTERACTION OF POLYMER GASOLINE WITH

| | Abietic Acid | Tall Oil | Oleic Acid |
|---|---|---|---|
| Yield, percent of organic charge | 50 | 51 | 48 |
| Properties of Products: | | | |
| Bromine No | 110 | 132 | 149 |
| Maleic Anhydride Value | 66 | 51 | 50 |
| Mol. Wt | 344 | 393 | 750 |
| Acidity (mg. KOH/g.) | 9 | 13.7 | 17 |
| Double bonds per mole, ave | 2.4 | 3.2 | 7.0 |

The molecular weight of the product from tall oil is slightly lower than might be expected from inter-reaction of equal molar quantities of the reactants while the acidities of all products are considerably lower than indicated from the oxygen content of the product assuming the oxygen to be in acidic form. This may be questionable, however, in view of the consistently low acidity values; on the other hand, the acid value method may not be accurate for acids of the high molecular weight to be expected in the present products.

In the drying test, a film of the product from the interaction of tall oil and polymer gasoline dried readily but became quite brittle. Qualitatively, its brittleness appears to be intermediate between that of the non-brittle film of the polymer gasoline-oleic acid product and the quite brittle film of the polymer gasoline-abietic acid product.

Boiling ranges and other properties of the upper layer and lower layer liquid products obtained from interaction of tall oil and polymer gasoline in the presence of liquid hydrogen fluoride are given in Table II.

EXAMPLE VII 185 grams of polymer gasoline, 65 grams of ricinoleic acid and 189 grams of anhydrous hydrogen fluoride were placed in a turbomixer of one liter capacity and stirred at a temperature of 90°–95° C. for a time of one hour at a pressure of 114 pounds per square inch. The resultant reaction mixture was permitted to stand in a settler at 4°–10° C. and separated into 334 grams of lower hydrogen fluoride catalyst layer and 97 grams of a hydrocarbon upper layer. Hydrolysis of the hydrofluoric acid lower layer yielded 135 grams of a drying oil product.

In this run dehydropolymerization was obtained with formation of a saturated upper layer and a lower hydrogen fluoride layer. Carbon and hydrogen analyses of the organic material obtained by hydrolyzing the hydrogen fluoride lower layer showed the presence of 2.55% oxygen which represents 33% of the oxygen charged in the ricinoleic acid (12-hydroxy-9:10-octadecenoic acid). The large yield of drying oil product indicates substantially complete interaction on the basis of a 70 gram yield of drying oil generally obtainable from 185 grams of polymer gasoline. The drying oil formed in this run also has a high boiling range and high molecular weight of 445. Although this molecular weight is not as high as might be expected with complete dehydrocopolymerization, it may be accounted for on the basis of partial dehydration and partial decarboxylation of ricinoleic acid. Dehydration of ricinoleic acid which has been accomplished even by milder dehydrating agents than hydrogen fluoride would account for 33% of the charged oxygen. The remaining 33–34% of oxygen which is equivalent to 50% of that charged as acid radicals, might be accounted for through decarboxylation or splitting off of lower molecular weight water soluble acids, or reduction of the acid to an alcohol. In drying tests, films of the drying oil obtained from the polymer gasoline and ricinoleic acid, both in the presence and absence of driers, dried readily to a smooth finish which eventually became slightly brittle but less brittle than the film formed from drying oils produced from polymer gasoline only.

EXAMPLE VIII 185 grams of the polymer gasoline referred to in Table I, 20 grams of methyl acrylate, and 180 grams of anhydrous hydrogen fluoride were reacted in a turbomixer of one liter capacity for one hour at a temperature of from 90° to 95° C. and at a maximum pressure of 131 pounds per square inch. The resultant reaction mixture upon standing separated into a two layer system from which 272 grams of a lower hydrofluoric acid catalyst layer was withdrawn from 101 grams of an upper hydrocarbon layer. The upper layer after washing successively with water, sodium bicarbonate solution, and again with water and then drying, had a weight of 95 grams. The lower hydrofluoric acid catalyst layer was washed with pentane to remove small amounts of saturated hydrocarbons and the pentane extracted hydrofluoric acid layer was then hydrolyzed by treatment with ice and water thereby separating a liquid organic material. The liquid organic material by washing successively with water, sodium bicarbonate solution and water and then drying, weighed 89 grams and thus corresponded to 43.5% by weight of the total of the polymer gasoline and methyl acrylate charged to the process.

Dehydrocopolymerization was obtained in this run as evidenced by the formation of an upper layer, which consisted of saturated hydrocarbons and a lower hydrofluoric acid layer containing unsaturated organic material having combined oxygen. Carbon and hydrogen analysis of the upper layer showed the presence of about 0.8% oxygen which would account for about 9% of the oxygen present in the methyl acrylate charged. Carbon and hydrogen analysis on the lower layer organic product showed the presence of about 6.3% oxygen which indicated that about 75% of the oxygen present in the charged methyl acrylate appeared in the lower layer product.

In a drying test on the resultant lower layer product, a film spread on a thin tin plate was characterized by its slow drying properties and by the persistence of a slight tack after two months of exposure.

The boiling ranges of the upper layer and lower layer products and other properties of these materials are given in Table V.

Table V
PROPERTIES OF DRYING OIL PRODUCTS FORMED FROM POLYMER GASOLINE AND METHYL ACRYLATE, ETHYL ACRYLATE AND ACRYLONITRILE

| Example No. | VIII Methyl | IX Ethyl | X Acrylo-Nitrile |
|---|---|---|---|
| | Acrylate | Acrylate | Run (2) |
| Upper Layer: | | | |
| Bromine No. | 0.8 | 1 | 0.5 |
| $n_D^{20}$ | 1.4199 | 1.4215 | 1.4221 |
| $d_4^{20}$ | 0.7450 | 0.7429 | 0.7468 |
| Carbon, percent | 84.46 | 84.92 | |
| Hydrogen, percent | 14.77 | 14.98 | |
| Nitrogen, percent | | | 0.2 |
| Fluorine, percent | | | 0.018 |
| Percent Boiling above 200° C | 55.3 | 54.9 | 59.5 |
| Specific Disp. | | | 102 |
| Lower Layer Product: | | | |
| Bromine No. | 140 | 121 | 129 |
| Maleic Anhydride Value | 46 | 38 | 35 |
| Mol. Wt. | 230 | 278 | 242 |
| Double bonds per mole, Ave. | 2.0 | 2.1 | 2.0 |
| $n_D^{20}$ | 1.4904 | 1.4883 | |
| $d_4^{20}$ | 0.9216 | 0.9238 | 0.903 |
| Color (Gardner) | 18 | 16 | >18 |
| Viscosity (poises at 25° C.) | <5 | <5 | <5 |
| Carbon, percent | 82.44 | 82.35 | |
| Hydrogen, percent | 11.26 | 11.40 | |
| Percent boiling above 275° C | | 83.4 | |
| Percent boiling above 280° C | 81.7 | | |
| Percent boiling above 300° C | | | 61.9 |
| Percent boiling above 325° C | 55.2 | 62.1 | |

EXAMPLE IX 185 grams of the aforementioned polymer gasoline and 24 grams of ethyl acrylate were contacted with 179 grams of anhydrous hydrogen fluoride at a temperature of 90° to 95° C. during a time of one hour at a maximum pressure of 135 pounds per square inch. The resultant stirred mixture was then permitted to stand and separate into layers from which 282 grams of lower hydrofluoric acid layer was withdrawn from 96 grams of an upper hydrocarbon layer. After washing and drying, the upper hydrocarbon layer weighed 91 grams. The lower hydrofluoric acid layer, after pentane extraction, hydrolysis by ice and water, followed by washing and drying, yielded 92 grams of unsaturated organic liquid which thus represented 44% by weight of the total polymer gasoline and ethyl acrylate charged to the turbomixer.

The results obtained in this run are quite similar to those obtained in Example VIII in which methyl acrylate and polymer gasoline were reacted. However, in the present run, the saturated upper layer contained no oxygen while analysis of the organic material separated from the lower layer indicated the presence of 6.25% by weight of oxygen.

As in the case with the lower layer product obtained in Example VIII, the lower layer product of the present example yielded a film which without drier dried slowly and exhibited persistent tack. However, when drier was added to this material, it dried with relative rapidity forming a film which eventually became somewhat brittle but was less brittle than the film produced from lower layer hydrocarbons formed similarly from polymer gasoline alone.

The boiling range and other properties of the upper layer and lower layer products obtained in this run on polymer gasoline and ethyl acrylate are given in Table V.

EXAMPLE X

Acrylonitrile and polymer gasoline and acrylonitrile alone were reacted in contact with anhydrous hydrogen fluoride as shown in Table VI.

Table VI
REACTION OF ACRYLONITRILE WITH AND WITHOUT POLYMER GASOLINE

| Run No. | 1 | 2 |
|---|---|---|
| Reaction Temp., ° C | 90-95 | 90-95 |
| Reaction time, hrs | 1 | 1 |
| Charge, gms.: | | |
| Acrylonitrile | 50 | 12 |
| HF | 170 | 190 |
| Polymer Gasoline | 0 | 185 |
| Total | 220 | 387 |
| Recovered, gms.: | | |
| Upper layer | 0 | 82 |
| HF by titration | | 1.5 |
| Lower layer | 214 | 284 |
| HF by titration | | 189 |
| Total | 214 | 366 |
| Upper layer treatment: | | |
| 1. Recovered after H$_2$O washing, caustic washing, and drying, gms | | 64 |
| Lower layer hydrolysis: | | |
| 1. Recovered, gms | a 20 | b 100 |
| Total organic product recovery, gms | 20 | 164 |
| Percent loss | 60 | 17 |
| Total HF recovery, gms | | 190.5 |
| Percent loss | | 0 | a After neut. of homogeneous hydrolysis soln., and ether extraction (6 gms. solids +14 gms. liquid).
b After pentane was (added to upper layer) and hydrolysis over ice (25 gms. from lower H$_2$O layer by neutralization and ether extraction and 75 gms. from upper separated layer by neutralization and ether extraction).

In run 1, acrylonitrile was contacted alone with anhydrous hydrogen fluoride. No detectable upper layer was formed. Upon hydrolysis of the sludge a homogeneous solution was obtained. Neutralization and ether extraction of this solution resulted in recovery of only 40% of the charge. Of the 40%, 70% was a liquid and 30% a semi-solid. Ultra-violet absorption analysis on the liquid showed no bands. A suitable organic solvent could not be found for the solid.

The results of the reaction of polymer gasoline with acrylonitrile are shown in run 2. Hydrolysis of the lower layer resulted in recovery of 100 gms. of product which represents a yield of 51% based on the total charge or 54% based on the polymer gasoline charged. Nitrogen analysis on this product showed it contained 2.18% nitrogen. This value represents 69% of the nitrogen charged as the nitrile.

No unreacted acrylonitrile was found in either the upper or lower layer products upon their distillation. The upper layer did, however, contain 0.2% nitrogen. Since the sample was neutral, the nitrogen may have been present in the form of a saturated amide or nitrile. The dispersions of the upper layer fractions boiling in the propionitrile range are indicative of its absence.

The lower layer hydrolysis product had a lower molecular weight, bromine number, and maleic anhydride value than did the drying oil formed from polymer gasoline only. In the drying test it formed a reddish colored film which dried slowly and became brittle in about one month.

The boiling ranges of the upper layer and lower layer products and other properties of the material obtained in run 2 are given in Table V.

EXAMPLE XI 185 grams of the polymer gasoline referred to in Table I, and 62 grams of peanut oil were charged to a Turbo-mixer of one liter capacity, the free space was filled with nitrogen and then 189 grams of anhydrous hydrogen fluoride was added to the mixture. The resultant reaction mixture was stirred for one hour at a temperature of 90°–95° C. and at a maximum pressure of 96 pounds per square inch. The resultant reaction mixture was then permitted to stand in a settler at 4°–10° C. and 349 grams of a hydrofluoric acid lower layer was separated from 61 grams of upper layer comprising essentially saturated hydrocarbons. The upper layer after washing and drying weighed 58.5 grams while an additional 29.5 grams of saturated material was obtained from the pentane extraction of the lower hydrofluoric acid layer. After pentane extraction of the lower layer and hydrolysis of the lower layer with water followed by washing and drying, there was obtained 138.5 grams of unsaturated liquid product. The carbon and hydrogen analysis of the lower layer product indicated an oxygen content of 5.65%. This amount of oxygen would correspond to approximately all of that present in the peanut oil charged and accordingly would indicate interaction of the peanut oil and polymer gasoline. Furthermore, the high yield of codehydromer, equal to 56% of the total charge, its relatively low bromine number, relatively low maleic anhydride value, and high yield (77.1%) of material boiling above 340° C. are additional indications that the peanut oil entered the lower layer product. The specific dispersion of 100 on the saturated upper layer is a further indication that oxygenated compounds are absent from this layer.

A film of the codehydromer, on tin, is characterized by its slow drying property both with and without driers. This behavior probably results from the presence of appreciable amounts of saturated fatty acid components in the peanut oil.

The boiling ranges of the upper layer and lower layer products and some other properties of these materials are given in Table VII.

Table VII

PROPERTIES OF DRYING OIL PRODUCTS FORMED FROM POLYMER GASOLINE AND CERTAIN VEGETABLE OILS

| Example No. | XI | XII | XIV | XV |
|---|---|---|---|---|
| Vegetable Oil used | Peanut | Soybean | Linseed | Castor |
| Upper Layer: | | | | |
| Bromine No. | 0.5 | 1 | 0.7 | 2 |
| $n_D^{20}$ | 1.4193 | 1.4194 | 1.4206 | 1.4221 |
| $d_4^{20}$ | 0.7630 | 0.7472 | 0.7501 | 0.7551 |
| Spec. Disp. | 100 | 95 | 99 | 101 |
| Acidity (mg. KOH/gm.) | | 1.0 | | |
| Percent boiling above 200° C. | 57.7 | 48.5 | 60.3 | 60.6 |
| Lower Layer Product: | | | | |
| Bromine No. | 95 | 111 | 106 | 122 |
| Maleic Anhydride Value | 38 | 34 | 35 | 39 |
| Mol. Wt. | 291 | 539 | 530 | 542 |
| Double bonds per mole, Ave. | 2.3 | 3.7 | 3.5 | 4.1 |
| Acidity (mg. KOH/gm.) | 9.5 | 1.8 | 2 | |
| $n_D^{20}$ | 1.4807 | 1.4906 | 1.4917 | |
| $d_4^{20}$ | 0.8948 | 0.9110 | 0.9146 | 0.9190 |
| Spec. Disp. | 122 | 122 | 127 | |
| Color (Gardner) | 18 | >18 | >18 | >18 |
| Viscosity (poises at 25° C.) | >5 | 16 | 32 | 32 |
| Carbon, percent | 81.95 | 82.86 | 83.60 | 82.40 |
| Hydrogen, percent | 12.40 | 11.75 | 12.21 | 12.13 |
| Percent boiling above 283° C. | 84.6 | | | |
| Percent boiling above 295° C. | | | 92.3 | |
| Percent boiling above 325° C. | | 88.2 | | 90.4 |

EXAMPLE XII 185 grams of the polymer gasoline referred to in Table I, 62 grams of soybean oil, and 195 grams of anhydrous hydrogen fluoride were reacted in a Turbomixer of one liter capacity at a temperature of 90° to 95° C. during a time of one hour and at a maximum pressure of 120 pounds per square inch. The resultant reaction mixture was then separated into 334 grams of a lower hydrofluoric acid layer and 91 grams of an upper layer. The upper layer and pentane extract of the lower layer were then washed successively with water, sodium bicarbonate solution and again with water to yield 90.5 grams of a saturated upper layer. The lower layer on hydrolysis with water washing and drying yielded 139 grams of organic liquid which represented 56% by weight of the total of polymer gasoline and soybean oil charged to the Turbomixer.

The data obtained in this run showed substantially complete interaction of polymer gasoline and soybean oil. Carbon and hydrogen analysis of the liquid product obtained from the lower layer indicated an oxygen content of 5.39% which represented essentially 100% of the oxygen content of the charged soybean oil. Additional evidence on this might also be found in the large yield of product and the large percentage (88.2%) of the product boiling above 325° C. Furthermore, the determined molecular weight of 539 is relatively close to the calculated value (520) based on the assumption of drying oil production with molecular weight of 290 from polymer gasoline only and the interaction of one mole of hydrocarbon dehydromer with each mol of soybean oil. In a mixture the molecular weight should be around 420, while if 3 mols of hydrocarbon dehydromer interact with one of soybean oil, the molecular weight should be around 1070. Additional evidence of interaction is shown below in the drying test.

In the drying test a film of the product is very slow drying and takes about 33 days to become dust free while it has not dried hard even after 48 days. However, when drier is added the film becomes dust free in less than 2 days and dries hard in 2 days and reaches a maximum Sward hardness of 12. The film is not brittle even after 38 days.

In order to determine any difference in the drying properties between the above product and a known mixture of oils, a sample of the same soybean oil charged and a dehydromer produced from polymer gasoline alone were mixed together in a ratio of 62 to 77 grams and the mixture with and without drier was spread on tin to dry. In both cases, films were slightly tacky after 37 days. The difference in the drying times of the samples with the drier added is quite evident. Furthermore, the determined molecular weight (367) of the mixture agrees closely with the calculated value (383) on the basis of the experimental value of 263 for the dehydromer formed from the polymer gasoline alone and the approximate value of the molecular weight of soybean oil, namely 881.

Boiling ranges and other properties of the upper layer and lower layer liquid products obtained by treating a mixture of polymer gasoline and soybean oil with hydrogen fluoride are given in Table VII.

EXAMPLE XIII

In order to ascertain the effect of varying the relative ratio of soybean oil to hydrocarbon olefin in the preparation of the drying oil, three additional experiments (Nos. 1, 2, and 3 of Table VIIII) were run at conditions otherwise similar to those of Example XII. In all cases interaction of the two charged materials occurred, but the product formed with the largest amount of soybean oil (Experiment 3) dried excessively slowly. The optimum product under these conditions appeared to be that formed in the range of approximately 35 to about 75 parts of soybean oil per 185 parts of polymer gasoline.

Additional experiments were conducted to determine the effect of reaction temperature upon the product quality. Thus Experiment 3, 4, and 5 of Table VIII comprises a series in which the temperature and reaction time were varied while the other factors were maintained constant, while Experiment 6 of Table VIII is comparable with the run of Example XII except for the temperature and time of contact.

The data obtained in these experiments indicate that optimum results were obtained at a reaction temperature of from 60° to 95° C., although interaction and dehydropolymerization took place at all of the conditions tested.

The boiling ranges and other properties of the upper layer and lower layer products recovered in this run on linseed oil and polymer gasoline are given in Table VII together with drying tests in Table IX.

*Table VIII*

INTERACTION OF SOYBEAN OIL AND POLYMER GASOLINE

| Experiment No. | 1 | 2 | 3 | 4 | 5 | 6 |
|---|---|---|---|---|---|---|
| Reaction Temp., °C | 90–95 | 90–92 | 90–95 | 60–65 | 125–130 | 25–30. |
| Reaction Time, hrs | 1 | 1 | 1 | 5 | 1 | 2. |
| Maximum Pressure, p. s. i | 135 | 120 | 95 | 70 | 220 | 15. |
| Charge, gms.: | | | | | | |
| Soybean Oil | 18 | 35 | 130 | 130 | 130 | 62. |
| Polymer Gasoline | 185 | 185 | 185 | 185 | 185 | 185. |
| Anhydrous HF | 185 | 196 | 195 | 209 | 196 | 187. |
| Recovered, gms.: | | | | | | |
| 1. Upper layer | 98 | 96 | 51 | 52 | 84 | 88. |
| Upper Layer after washing | 97.5 | 99 | 86 | 79 | 130 | 102. |
| Washed upper layer includes recovery by pentane wash of lower layer | 4.5 | 6 | 39 | 28 | 53 | 18. |
| 2. Lower layer | 281 | 310 | 453 | 466 | 421 | 338. |
| Lower layer product after hydrolysis | 91 | 109 | 222 | 223 | 168 | 140. |
| Yield-percent of organic charge | 44.9 | 49.5 | 70.5 | 70.8 | 53.3 | 56.7 |
| Properties of Products: | | | | | | |
| Upper layer (washed) Bromine No | 1 | Below 1 | 1 | Below 1 | Below 1 | 5. |
| Lower layer product Bromine No | 156 | 120 | 78 | 71 | 70 | 88. |
| Double bonds per mole, ave | 3.3 | 3.2 | 2.8 | 2.3 | 2.1 | 2.7 |
| Maleic Anhydride value | 66 | 48 | 21 | 26 | Low | 31. |
| Mol. Wt | 338 | 425 | 581 | 512 | 486 | 486. |
| Carbon, percent | 85.52 | 81.22 | 80.28 | | | |
| Hydrogen, percent | 12.50 | 12.04 | 12.08 | | | |
| Oxygen, percent (by difference) | 1.98 | 6.74 | 7.64 | | | |
| Drying speed (with drier) | Fair | Fair | Very slow | Very slow | Very slow | Very slow. |

EXAMPLE XIV 185 grams of polymer gasoline, 62 grams of linseed oil, and 189 grams of anhydrous hydrogen fluoride were charged to a Turbomixer of one liter capacity and reacted at a temperature of 90° to 95° C. for one hour at a maximum pressure of 108 pounds per square inch. The resultant reaction mixture was then permitted to settle at 4° to 10° C. and 344 grams of a hydrofluoric acid layer was withdrawn from 91 grams of an upper layer. The upper layer and pentane extract of the lower layer after washing with water, sodium bicarbonate solution and again with water and drying yielded 93 grams of a substantially saturated hydrocarbon mixture. The pentane extracted lower layer after hydrolysis with water and water washing yielded 143 grams of unsaturated liquid product.

In Example XI it was shown that some degree of interreaction was obtained with peanut oil and polymer gasoline in contact with liquid hydrogen fluoride at the sludging conditions used in these different examples. Peanut oil is a glyceride of fatty acids of which the principal component is oleic acid which contains one double bond. Also in Examples XII and XIII it was shown that soybean oil and polymer gasoline undergo substantial interreaction in the presence of liquid hydrogen fluoride. Soybean oil is more unsaturated than peanut oil, its principal fatty acid component being linoleic acid. The linseed oil used in the present run contains linoleic acid as a major fatty acid component and considerable quantities of linolenic acid in addition, and is accordingly still more unsaturated than soybean oil.

In this run dehydrocopolymerization was obtained with the formation of the usual hydromer layer and a lower hydrofluoric acid layer containing the unsaturated dehydromer. Carbon and hydrogen analysis on the organic product recovered from the lower layer indicated a 4.2% oxygen content which represents 88% of the oxygen present in the linseed oil charged, considering linseed oil as being represented as a triglyceride ester of $C_{18}$ fatty acids. Actually this assumption may be in error by as much as 12% and it is probably safe to conclude that all of the linseed oil is in the lower layer product. Furthermore, the determined molecular weight (530) is close to the calculated value of 524 for an inter-reaction product. Additional evidence of the presence of the linseed oil in the product may be noted in the large yield and high boiling character of the product.

*Table IX*

Drying oil formed from linseed oil and polymer gasoline

| Drying Test | With Drier | Without Drier |
|---|---|---|
| Dry (dust free) days | Below 1 | 8 |
| Maximum Sward Hardness | 12 | 12 |
| Dried hard, Days | 1–4 | 8–11 |
| Brittleness after one month | None | None |

EXAMPLE XV 185 grams of polymer gasoline, 65 grams of castor oil, and 170 grams of anhydrous hydrogen fluoride were charged to the Turbomixer of one liter capacity and reacted at a temperature of 90° to 95° C. for one hour at a maximum pressure of 105 pounds per square inch. The resultant reaction mixture was separated into 309 grams of a hydrofluoric acid layer and 98 grams of a hydrocarbon layer. Hydrocarbon layer and pentane extract of the hydrofluoric acid layer were washed with water and treated to give 101 grams of a substantially saturated hydrocarbon layer. The lower layer was hydrolyzed with water and a drying oil product weighing 130 grams was separated from the dilute hydrofluoric acid.

The castor oil which was used as a reactant in this run may be considered as essentially a triglyceride ester of ricinoleic acid. This acid (12-hydroxy-9,10-octadecenoic acid) constitutes about 87% of the total fatty acid content of the oil. The castor oil used in this run had a bromine number of 51, a refractive index, $n_D^{20}$ of 1.4788 and a specific gravity, $d_4^{20}$, of 0.9616.

Inter-reaction of the polymer gasoline and castor oil occurred in this run with formation of a saturated hydrocarbon upper layer and a lower hydrofluoric acid layer. The lower layer organic product separated therefrom by hydrolysis contains 71% of the oxygen present in the castor oil charged to the process. It is believed that in the course of the reaction the bulk of the oil was dehydrated at the 11–12 or 12–13 positions of the ricinoleic acid groups. The molecular weight of the lower layer product was 542 and accordingly is close to the theoretical value of 530 for complete inter-reaction of dehydrated castor oil and a hydrocarbon drying oil of 290 molecular weight obtainable from polymer gasoline alone. More than 90% of the drying oil material formed in this run boiled above 325° C.

In drying tests a film of the lower layer product dried slowly and still had a slight after-tack after 26 days.

The boiling ranges and other properties of the upper layer and lower layer products recovered from this run on castor oil and polymer gasoline are given in Table No. VII.

We claim as our invention:

1. A process for producing a drying oil which comprises forming a reaction mixture consisting essentially of an olefinic hydrocarbon having at least three carbon atoms per molecule, an unsaturated organic compound selected from the members of the group consisting of a non-aromatic unsaturated organic acid, its anhydride, and amides, nitriles, alkyl esters, glycol esters, glyceryl esters and pentaerythritol esters of said acid, and a hydrogen fluoride catalyst, reacting said mixture until there is formed a reaction product comprising essentially saturated hydrocarbons and a used catalyst layer containing a complex of some of the hydrogen fluoride catalyst with poly-unsaturated liquid organic compounds, separating the reaction product into a hydrocarbon layer and a used hydrofluoric acid catalyst layer, separating a saturated hydrocarbon product from the hydrocarbon layer, and decomposing the complex in the used hydrofluoric acid catalyst layer to recover a drying oil having an average molecular weight greater than that of the olefinic hydrocarbon charge stock.

2. A process for producing a drying oil which comprises forming a reaction mixture consisting essentially of a normally liquid monoolefinic hydrocarbon, an unsaturated organic compound selected from the members of the group consisting of a non-aromatic unsaturated organic acid, its anhydride, and amides, nitriles, alkyl esters, glycol esters, glyceryl esters and pentaerythritol esters of said acid, and a hydrogen fluoride catalyst, reacting said mixture until there is formed a reaction product comprising essentially saturated hydrocarbons and a used catalyst layer containing a complex of some of the hydrogen fluoride catalyst with poly-unsaturated liquid organic compounds, separating the reaction product into a hydrocarbon layer and a used hydrofluoric acid catalyst layer, separating a saturated hydrocarbon product from the hydrocarbon layer, and decomposing the complex in the used hydrofluoric acid catalyst layer to recover a drying oil having at least two double bonds per molecule and an average molecular weight greater than that of the normally liquid monoolefinic hydrocarbon charged.

3. A process for producing a drying oil which comprises forming a reaction mixture consisting essentially of a normally liquid monoolefinic hydrocarbon, an unsaturated aliphatic carboxylic acid, and a hydrogen fluoride catalyst, reacting said mixture until there is formed a reaction product comprising essentially saturated hydrocarbons and a used catalyst layer containing a complex of some of the hydrogen fluoride catalyst with poly-unsaturated liquid organic compounds, separating the reaction product into a hydrocarbon layer and a used hydrofluoric acid catalyst layer, separating the saturated hydrocarbon products from the hydrocarbon layer, and decomposing the complex in the used hydrofluoric acid catalyst layer to recover a drying oil having at least two double bonds per molecule and an average molecular weight greater than that of the normally liquid monoolefinic hydrocarbon charged.

4. A process for producing a drying oil which comprises forming a reaction mixture consisting essentially of a normally liquid monoolefinic hydrocarbon, an unsaturated alicyclic carboxylic acid, and a hydrogen fluoride catalyst, reacting said mixture until there is formed a reaction product comprising essentially saturated hydrocarbons and a used catalyst layer containing a complex of some of the hydrogen fluoride catalyst with poly-unsaturated liquid organic compounds, separating the reaction product into a hydrocarbon layer and a used hydrofluoric acid catalyst layer, separating the saturated hydrocarbon products from the hydrocarbon layer, and decomposing the complex in the used hydrofluoric acid catalyst layer to recover a drying oil having at least two double bonds per molecule and an average molecular weight greater than that of the normally liquid monoolefinic hydrocarbon charged.

5. The process defined in claim 2 further characterized in that the charged normally liquid monoolefinic hydrocarbon contains from about 5 to about 20 carbon atoms per molecule.

6. A process for producing a drying oil which comprises forming a reaction mixture consisting essentially of a hydrogen fluoride catalyst, a monoolefin hydrocarbon having at least three carbon atoms per molecule and an unsaturated organic compound selected from the members of the group consisting of a non-aromatic unsaturated organic acid, its anhydride, and amides, nitriles, alkyl esters, glycol esters, glyceryl esters and pentaerythritol esters of said acid, reacting said mixture at a temperature of from about 0° to about 175° C. until saturated hydrocarbons and a complex of hydrogen fluoride with poly-unsaturated organic compounds containing more carbon atoms per molecule than said monoolefin hydrocarbon charge stock are formed, separating the reaction product into a hydrocarbon phase and a hydrofluoric acid phase containing said complex, recovering the saturated hydrocarbons from the hydrocarbon phase, and decomposing said complex and separating a drying oil comprising poly-unsaturated organic compounds from the hydrofluoric acid phase.

7. A process for producing a drying oil which comprises forming a reaction mixture consisting essentially of a hydrogen fluoride catalyst, a normally liquid monoolefin and an unsaturated organic compound selected from the members of the group consisting of a non-aromatic unsaturated organic acid, its anhydride, and amides, nitriles, alkyl esters, glycol esters, glyceryl esters and pentaerythritol esters of said acid, reacting said mixture at a temperature of from about 0° to about 175° C. and at a pressure of from about 1 to about 100 atmospheres until saturated hydrocarbons and a complex of hydrogen fluoride with poly-unsaturated organic compounds containing more carbon atoms per molecule than said monoolefin are formed, separating the reaction product into a hydrocarbon phase and a hydrofluoric acid phase containing said complex, recovering the saturated hydrocarbons from the hydrocarbon phase, and decomposing said complex and separating a drying oil comprising poly-unsaturated organic compounds from the hydrofluoric acid phase.

8. A process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a monoolefinic hydrocarbon having at least three carbon atoms per molecule and one molar proportion of an unsaturated organic compound selected from the members of the group consisting of a non-aromatic unsaturated organic acid, its anhydride, and amides, nitriles, alkyl esters, glycol esters, glyceryl esters and pentaerythritol esters of said acid at a temperature of from about 0° to about 175° C., agitating the reaction mixture for a time sufficient to effect dehydropolymerization to form a saturated hydrocarbon material and a complex of poly-unsaturated compounds with hydrogen fluoride, separating the reaction mixture into a hydrocarbon layer and a hydrofluoric acid layer containing said complex, recovering a drying oil from the hydrofluoric acid layer by decomposing said complex, and recovering a saturated hydrocarbon product from the hydrocarbon layer.

9. The process defined in claim 8 further characterized in that the charged monoolefin is a butylene.

10. The process defined in claim 8 further characterized in that the charged monoolefin is a normally liquid olefin.

11. A process for producing a drying oil which comprises mixing from about 0.1 to about 10 parts by weight of hydrofluoric acid of from about 90 to about 100% by weight hydrogen fluoride concentration and one part by weight of a mixture consisting essentially of from about 1 to about 50 molar proportions of a monoolefinic hydrocarbon having at least three carbon atoms per molecule and one molar proportion of a non-aromatic unsaturated organic acid having from about three to about twenty carbon atoms per molecule at a temperature of from about 0° to about 175° C., agitating the reaction mixture for a time sufficient to effect dehydropolymerization to form a saturated hydrocarbon material and a complex of poly-unsaturated compounds with hydrogen fluoride, separating the reaction mixture into a hydrocarbon layer and a hydrofluoric acid layer containing said complex, recovering a drying oil from the hydrofluoric acid layer by decomposing said complex, and recovering a saturated hydrocarbon product from the hydrocarbon layer.

12. A process for producing a drying oil which comprises mixing from about 0.1 to about 10 parts by weight of hydrofluoric acid of from about 90 to about 100% by weight of hydrogen fluoride concentration and one part by weight of a mixture consisting essentially of from about 1 to about 50 molar proportions of a monoolefinic hydrocarbon having at least three carbon atoms per molecule and one molar proportion of an anhydride of a non-aromatic unsaturated organic acid having from three to about twenty carbon atoms per molecule at a temperature of from about 0° to about 175° C., agitating the reaction mixture for a time sufficient to effect dehydropolymerization to form a saturated hydrocarbon material and a complex of poly-unsaturated compounds with hydrogen fluoride, separating the reaction mixture into a hydrocarbon layer and a hydrofluoric acid layer, recovering a drying oil from the hydrofluoric acid layer by decomposing said complex, and recovering a saturated hydrocarbon product from the hydrocarbon layer.

13. A process for producing a drying oil which comprises mixing from about 0.1 to about 10 parts by weight of hydrofluoric acid of from about 90 to about 100% by weight of hydrogen fluoride concentration and one part by weight of a mixture consisting essentially of from about 1 to about 50 molar proportions of a monoolefinic hydrocarbons having at least three carbon atoms per molecule and one molecular proportion of an ester of a polyhydric alcohol and of a non-aromatic unsaturated organic acid having from 3 to about 20 carbon atoms per molecule at a temperature of from about 0° to about 175° C., agitating the reaction mixture for a time sufficient to effect dehydropolymerization to form a saturated hydrocarbon material and a complex of poly-unsaturated compounds with hydrogen fluoride, separating the reaction mixture into a hydrocarbon layer and a hydrofluoric acid layer containing said complex, recovering a drying oil from the hydrofluoric acid layer by decomposing said complex, and recovering a saturated hydrocarbon product from the hydrocarbon layer.

14. A process for producing a drying oil which comprises mixing from about 0.1 to about 10 parts by weight of hydrofluoric acid of from about 90 to about 100% by weight of hydrogen fluoride concentration and one part by weight of a mixture consisting essentially of from about 1 to about 50 molar proportions of a monoolefinic hydrocarbon having at least three carbon atoms per molecule and one molecular proportion of a glyceryl ester of a non-aromatic unsaturated organic acid having from 3 to about 20 carbon atoms per molecule at a temperature of from about 0° to about 175° C., agitating the reaction mixture for a time sufficient to effect dehydropolymerization to form a saturated hydrocarbon material and a complex of poly-unsaturated compounds with hydrogen fluoride, separating the reaction mixture into a hydrocarbon layer and a hydrofluoric acid layer containing said complex, recovering a drying oil from the hydrofluoric acid layer by decomposing said complex, and recovering a saturated hydrocarbon product from the hydrocarbon layer.

References Cited in the file of this patent
UNITED STATES PATENTS

| | | |
|---|---|---|
| 2,252,333 | Rothrock | Aug. 12, 1941 |
| 2,253,323 | Christman | Aug. 19, 1941 |
| 2,400,521 | Kuhn | May 21, 1946 |
| 2,440,459 | Bloch | Apr. 27, 1948 |
| 2,440,477 | Johnstone | Apr. 27, 1948 |
| 2,622,109 | Bloch et al. | Dec. 16, 1952 |